(12) United States Patent
Anglin et al.

(10) Patent No.: US 10,006,506 B2
(45) Date of Patent: Jun. 26, 2018

(54) ANTI-ROTATIONAL SYSTEMS AND METHODS

(71) Applicant: United Technologies Corporation, Hartford, CT (US)

(72) Inventors: Christopher T. Anglin, Manchester, CT (US); Yuk-Kwan Brian Yuen, Wethersfield, CT (US); Russell B. Witlicki, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 213 days.

(21) Appl. No.: 14/660,575

(22) Filed: Mar. 17, 2015

(65) Prior Publication Data

US 2015/0292575 A1 Oct. 15, 2015

Related U.S. Application Data

(60) Provisional application No. 61/977,765, filed on Apr. 10, 2014.

(51) Int. Cl.
*F16D 41/12* (2006.01)
*F16D 63/00* (2006.01)
*F02C 7/36* (2006.01)

(52) U.S. Cl.
CPC ............ *F16D 41/12* (2013.01); *F02C 7/36* (2013.01); *F16D 63/006* (2013.01); *F05D 2260/40* (2013.01)

(58) Field of Classification Search
CPC ........ F16D 41/12; F16D 41/18; F16D 25/061; F16D 63/006; F16D 2260/40; F05D 2260/40; F02C 7/36
See application file for complete search history.

(56) References Cited

U.S. PATENT DOCUMENTS

| 2,308,926 | A | * | 1/1943 | Kreis | F16D 41/12 |
|---|---|---|---|---|---|
| | | | | | 192/46 |
| 3,521,505 | A | | 7/1970 | Sebring | |
| 4,964,344 | A | * | 10/1990 | Robinson | B65G 45/08 |
| | | | | | 104/172.5 |
| 5,183,387 | A | * | 2/1993 | Huggett | B64C 11/32 |
| | | | | | 188/164 |

(Continued)

FOREIGN PATENT DOCUMENTS

| CH | 256394 | 8/1948 |
|---|---|---|
| GB | 703262 | 2/1954 |

OTHER PUBLICATIONS

Extended European Search Report dated Aug. 26, 2015 in European Application No. 15163143.9.

*Primary Examiner* — Melody M Burch
(74) *Attorney, Agent, or Firm* — Snell & Wilmer L.L.P.

(57) ABSTRACT

An anti-rotational system is provided comprising a pawl carrier mounted for rotation within a ratchet, the pawl carrier having an axis of rotation, a pawl pivotably mounted to the pawl carrier on a pivot joint, the pawl having a contact portion and a counterweight portion, wherein the pivot joint is between the contact portion and the counterweight portion, wherein the counterweight portion is configured to be radially inward of the contact portion in response to rotation of the pawl carrier in a first rotational direction at an angular velocity less than a predetermined angular velocity.

11 Claims, 5 Drawing Sheets

(56) References Cited

U.S. PATENT DOCUMENTS

| | | | |
|---|---|---|---|
| 2004/0050641 A1* | 3/2004 | Jin | F16D 41/12 192/46 |
| 2007/0062775 A1* | 3/2007 | Bird | F16D 41/12 192/46 |
| 2008/0093189 A1* | 4/2008 | Wiesneth | F16D 41/12 192/45.1 |
| 2011/0284677 A1* | 11/2011 | Pengg | B60C 27/10 242/384.7 |

* cited by examiner

ANTI-ROTATIONAL SYSTEMS AND METHODS

CROSS-REFERENCE TO RELATED APPLICATIONS

This application is a nonprovisional of, and claims priority to, and the benefit of U.S. Provisional Application No. 61/977,765, entitled "ANTI-ROTATIONAL SYSTEMS AND METHODS," filed on Apr. 10, 2014, which is hereby incorporated by reference in its entirety.

FIELD

The present disclosure relates to anti-rotational systems and methods, and more specifically, to anti-rotational systems and methods applicable to turbine engines.

BACKGROUND

Turbine engines typically windmill when idle. A turbine engine will often windmill due to wind blowing through the engine. Many times, wind enters through the engine outlet, causing the engine to windmill in reverse. Many turbine engines do not have a feature to prevent the reverse wind milling of the engine or utilize a complex and/or heavy system to accomplish this feature. Moreover, forward wind milling is often desired, for example, to enable the engine to more readily restart in flight. Reverse wind milling is not desired, for example, to reduce wear on the engine when idle. A turbine engine typically has a system to facilitate lubrication of rotating components when idle, but often this system only lubricates the rotating components when the engine is forward wind milling. Thus, reverse wind milling is often not desired.

SUMMARY

An anti-rotational system is provided comprising a pawl carrier mounted for rotation within a ratchet, the pawl carrier having an axis of rotation, a pawl pivotably mounted to the pawl carrier on a pivot joint, the pawl having a contact portion and a counterweight portion, wherein the pivot joint is between the contact portion and the counterweight portion, wherein the counterweight portion is configured to be radially inward of the contact portion in response to rotation of the pawl carrier in a first rotational direction at an angular velocity less than a predetermined angular velocity.

In various embodiments, the counterweight portion is configured to be radially outward of the contact portion in response to rotation of the pawl carrier at an angular velocity greater than a predetermined angular velocity. In various embodiments, a center of mass of the pawl is located more proximate the counterweight portion than the contact portion. In various embodiments, the pawl is comprised of at least one of stainless steel and a chromium-nickel-tungsten martensitic alloy. In various embodiments, the ratchet comprises a ratchet tooth. In various embodiments, the pawl carrier and ratchet are mounted to rotate coaxially. In various embodiments, the contact portion is configured to contact the ratchet tooth in response to rotation of the pawl carrier in a second rotational direction. In various embodiments, a second pawl is pivotably mounted to the pawl carrier and a third pawl is pivotably mounted to the pawl carrier. In various embodiments, the pawl, the second pawl and the third pawl are spaced 120 degrees apart on the pawl carrier. In various embodiments, the ratchet has a variable radius. In various embodiments, the predetermined angular velocity is between about 500 rpm and 1500 rpm. In various embodiments, the interaction between the contact portion and the ratchet tooth prevent rotation of the pawl carrier in the second rotational direction. In various embodiments, the pivot joint is at least one of lubricated and plated. In various embodiments, a torsion spring is disposed proximate the pivot joint and configured to exert an outward radial force on the contact portion of the pawl. In various embodiments, a stop pin disposed on the pawl carrier. In various embodiments, the pawl comprises a cutout portion. In various embodiments, in response to the rotation of the pawl carrier in the first rotational direction at the angular velocity greater than the predetermined angular velocity, the counterweight portion extends radially outward of the contact portion. In various embodiments, in response to the rotation of the pawl carrier in the first rotational direction at the angular velocity less than the predetermined angular velocity, the contact portion extends radially outward of the counterweight portion. In various embodiments, in response to the rotating a pawl carrier in the second rotational direction, the contact portion of the pawl engages a ratchet tooth of the ratchet.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
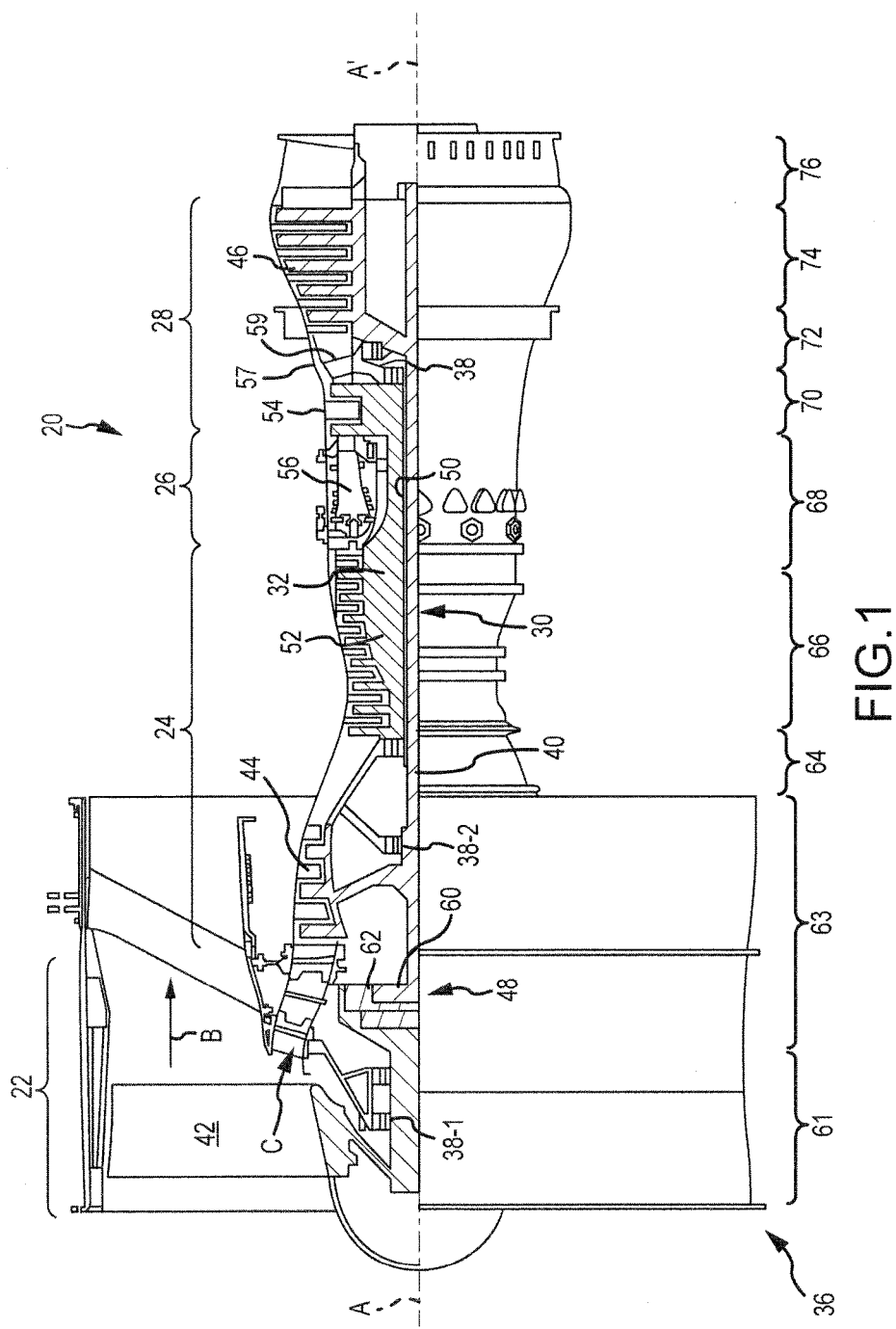
FIG. 1 illustrates a turbofan engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

With reference to FIG. 1, gas turbine engine 20 may generally include multiple of modules including for example, a fan case module 61, an intermediate case module 63, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76.

As described above, an anti-rotational device may be used to prevent reverse windmilling in a turbofan engine. In particular, an anti-rotational device may be disposed in the low pressure turbine to prevent rotation in an undesired direction. For example, an anti-rotational device may be configured to allow rotation in a first direction (e.g., clockwise) and to limit all or nearly all rotation in a second direction (e.g., counter clockwise). Moreover, an anti-rotational device may be configured to limit mechanical contact at or above certain angular velocities. In that regard, lower angular velocities may be associated with a level of mechanical contact between various components but, after a low pressure turbine achieves a given angular velocity, the contact may be reduced or eliminated.

Figure 2:
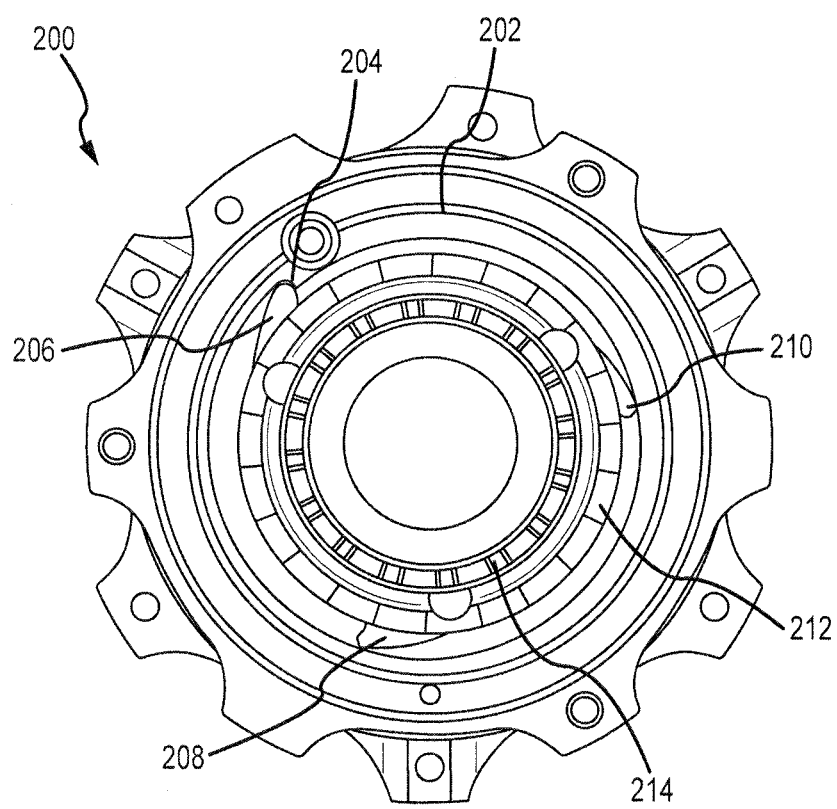
FIG. 2 illustrates an anti-rotation device according to various embodiments.

With reference to FIG. 2, anti-rotational device 200 is shown. Ratchet 202 is shown disposed coaxially to pawl carrier 212. Pawl carrier 212 is configured to rotate while ratchet 202 is constrained from rotation. Ratchet 202 has a variable radius. For example, the radius from the axis of rotation may vary in length along the inner circumference of ratchet 202. As shown, for example, the radius drawn near ratchet tooth 204 is larger than the radius twenty degrees clockwise form ratchet tooth 204.

Pawl carrier 212 is configured to rotate within ratchet 202. Pawl carrier 212 is clamped by pawl nut 214 onto a central shaft, such as low pressure turbine shaft 501 with brief reference to FIG. 5. With reference back to FIG. 2, the central shaft may be driven by a motor or other device that may cause rotation of the central shaft. In various embodiments, the central shaft is a low pressure turbine shaft. Pawl nut 214 transfers torque to pawl carrier 212 and thus drives rotation of pawl carrier 212. Pawl carrier 212 is shown rotating in a counter-clockwise direction. In particular, pawl carrier 212 is shown rotating at an angular velocity below a predetermined angular velocity.

Pawls 206, 208 and 210 are shown distributed uniformly about the circumference of pawl carrier 212. In other words, pawl 206 is one hundred twenty (120) degrees from pawl 208 which in turn is one hundred twenty (120) degrees from pawl 210, which in turn is one hundred twenty (120) degrees from pawl 206.

Pawls 206, 208 and 210 may be comprised of any suitable material. For example, pawls 206, 208 and 210 may be comprised of stainless steel such as 300M stainless steel and/or chromium-nickel-tungsten martensitic alloy (also known as Greek Ascoloy). In various embodiments, various components disclosed herein may comprise 300M stainless steel and/or chromium-nickel-tungsten martensitic alloy (also known as Greek Ascoloy) and/or austenitic nickel-chromium-based alloy such as Inconel® which is available from Special Metals Corporation of New Hartford, N.Y., USA, or any other high-temperature tolerant material, for example, titanium. However, in further embodiments, various components of anti-rotational devices may comprise other metals, such as tungsten, aluminum, steel, or alloys, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of anti-rotational devices as disclosed herein are made of different materials or combinations of materials, and/or may comprise coatings.

As pawl carrier 212 rotates in counterclockwise direction at an angular velocity below a predetermined angular velocity, each pawl will contact the ratchet near the ratchet tooth. In that regard, pawls 206, 208 and 210 will periodically contact the ratchet during each revolution. The movement of pawls 206, 208 and 210 may be limited by one or more stop pins disposed in the pawl carrier 212. With brief reference to FIG. 3, stop pin 316 is shown. A stop pin may be disposed in an axial direction and provide a contact point for a pawl to prevent the pawl from contacting pawl carrier 212. In that regard, pawl 206 may rotate radially inward about pivot joint 302 and contact stop pin 316.

Figure 3:
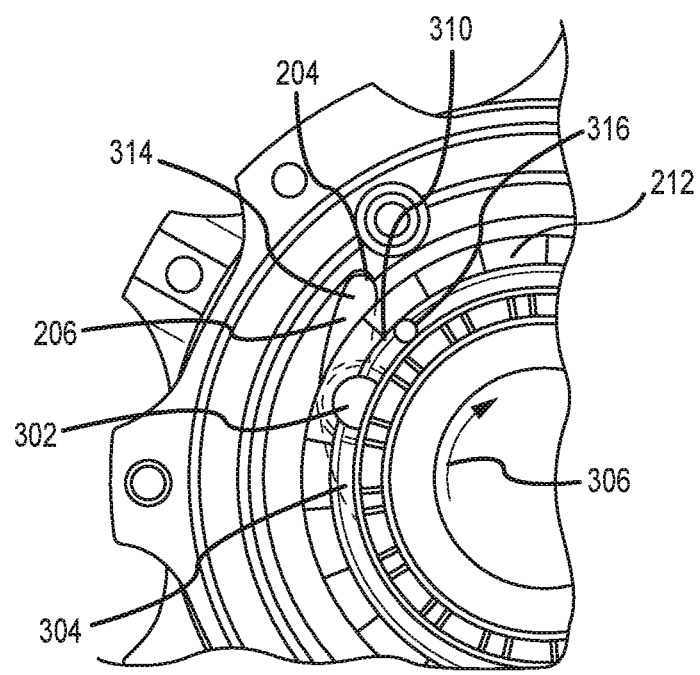
FIG. 3 illustrates an anti-rotation device according to various embodiments.

With reference to FIG. 3, pawl carrier 212 is shown rotating in a clockwise direction. Ratchet tooth 204 is shown interacting with pawl 206. In that regard, pawl 206 may interact (i.e., contact) ratchet tooth 204 and thus prevent pawl carrier 212 from rotating in a clockwise direction.

Pawl 206 is shown pivotably mounted to pawl carrier 212 on a pivot joint 302. Pivot joint 302 allows pawl 206 to rotate freely about pivot joint 302. Pivot joint 302 may comprise any suitable joint that is configured to allow pawl 206 to pivot. For a example, a post and bushing mating may be used as pivot joint 302. Pivot joint 302 may be suitably lubricated, for example, using a solid state lubricant and/or liquid lubricant. Pivot joint 302 may also comprise one or more materials that are coated and/or plated with or comprised of a low friction material. For example, portions of pivot joint 302 may be coated with polytetrafluoroethylene ("PTFE"). In various embodiments, pivot joint 302 is disposed at or near the geometric center of pawl 206.

Pawl 206 comprises counterweight portion 304 and contact portion 314. Pawl 206 may comprise a single integral piece comprising counterweight portion 304 and contact portion 314. Counterweight portion 304 may be integral to pawl 206 and may be formed by any suitable means, for example, by forging, casting, stamping, negative manufacturing techniques, additive manufacturing techniques and/or other methods of manufacture. Counterweight portion 304 may be configured such that the center of mass of pawl 206 is more proximate a terminus of counterweight portion 304 than a terminus of contact portion 314. Counterweight portion 304 may be configured to have a "scoop" or cut out and/or a portions of greater thickness and/or mass when compared with other portions of pawl 206.

Torsion spring 310 may be disposed to exert a radial outward force upon pawl 206, and similar torsion springs may be similarly disposed with respect to pawls 208 and 210. In that regard, torsion spring 310 exerts a rotational force on pawl 206 that tends to pivot pawl 206 about pivot joint 302 in a radially outward direction. Torsion spring 310 may be made from any suitable material, for example, stainless steel.

Upon rotation in clockwise direction 306, contact portion 314 may contact ratchet tooth 204, preventing rotation. In the embodiment shown in FIG. 3, therefore, the maximum rotation in clockwise direction 306 that would be possible is one hundred twenty degrees, as pawls 206, 208, and 210 are 120 degrees apart. In various embodiments, any number of pawls may be used, and thus the selection of the appropriate number of pawls and the spacing of the pawls may be tuned in response to design weight constraints, footprint, and other manufacturing concerns.

Figure 4:
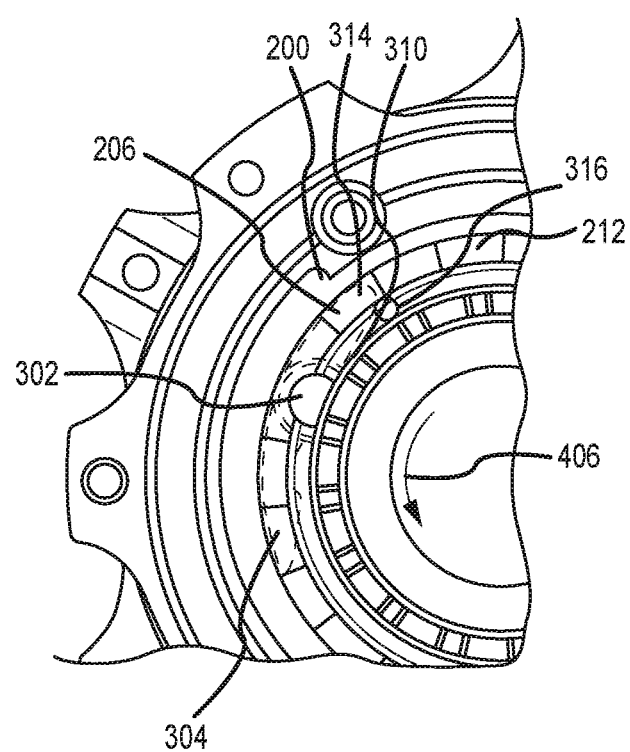
FIG. 4 illustrates an anti-rotation device according to various embodiments.

With reference to FIG. 4, pawl carrier 212 is shown rotating in counter-clockwise direction 406 at an angular velocity above a predetermined angular velocity. In response to rotation in counter-clockwise direction 406, a force will be exerted on counterweight portion 304 (e.g., centrifugal force). This force upon counterweight portion 304 will tend to counteract the rotational force exerted by torsion spring 310 on pawl 206. Stated another way, at lower angular velocities, the counterweight portion 304 will begin to oppose the force exerted by the torsion spring 310. As angular velocity increases, the force exerted on counterweight portion 304 may begin to overcome the force exerted by the torsion spring 310 and cause contact portion 314 to begin to rotate about pivot joint 302 in a radially inward direction. Conversely, the force will be exerted on counterweight portion 304 will cause counterweight portion 304 to rotate radially outward about pivot joint 302. In response to the angular velocity of pawl carrier 212 reaching the predetermined velocity, counterweight portion 304 will move contact portion 314 radially inward so that contact portion 314 no longer contacts the ratchet during each revolution. In that regard, rotation in counter-clockwise direction 406 is permitted, however, as pawl 210 may rotate past ratchet tooth 204 in a counter clockwise direction without interference from ratchet tooth 204.

The tuning of torsion spring 310 and the predetermined velocity may be adjusted to suit various design considerations, and it is contemplated that any torsion spring and predetermined velocity may be accomplished. In various embodiments, the predetermined velocity may be between about 5 revolutions per minutes ("rpm") and about 10,000 rpm, between about 300 revolutions per minutes ("rpm") and about 4,000 rpm, and/or about 600 revolutions per minutes ("rpm") and about 800 rpm, where the term "about" in this context only refers to +/−50 rpm.

Hooke's law may be adapted for use in torsion springs and may take the form of:

$$\tau = -\kappa\theta$$

In this equation, represents torque exerted by the spring, $\theta$ is the angle from the equilibrium position and $\kappa$ is the torsional spring constant. Though a torsion spring of any spring constant may be used, in various embodiments, torsion springs may be used having constants of about 0.1 pound inches per degree and about 0.3 pound inches per degree, and about 0.14 pound inches per degree and about 0.24 pound inches per degree, and about 0.17 pound inches per degree, where the term "about" in this context only refers to +/−0.02 pound inches per degree.

In that regard, Hooke's law may be used to find the torque exerted by the torsion spring and such information may be used to tune the mass and location of counterweight portion 304.

Figure 5:
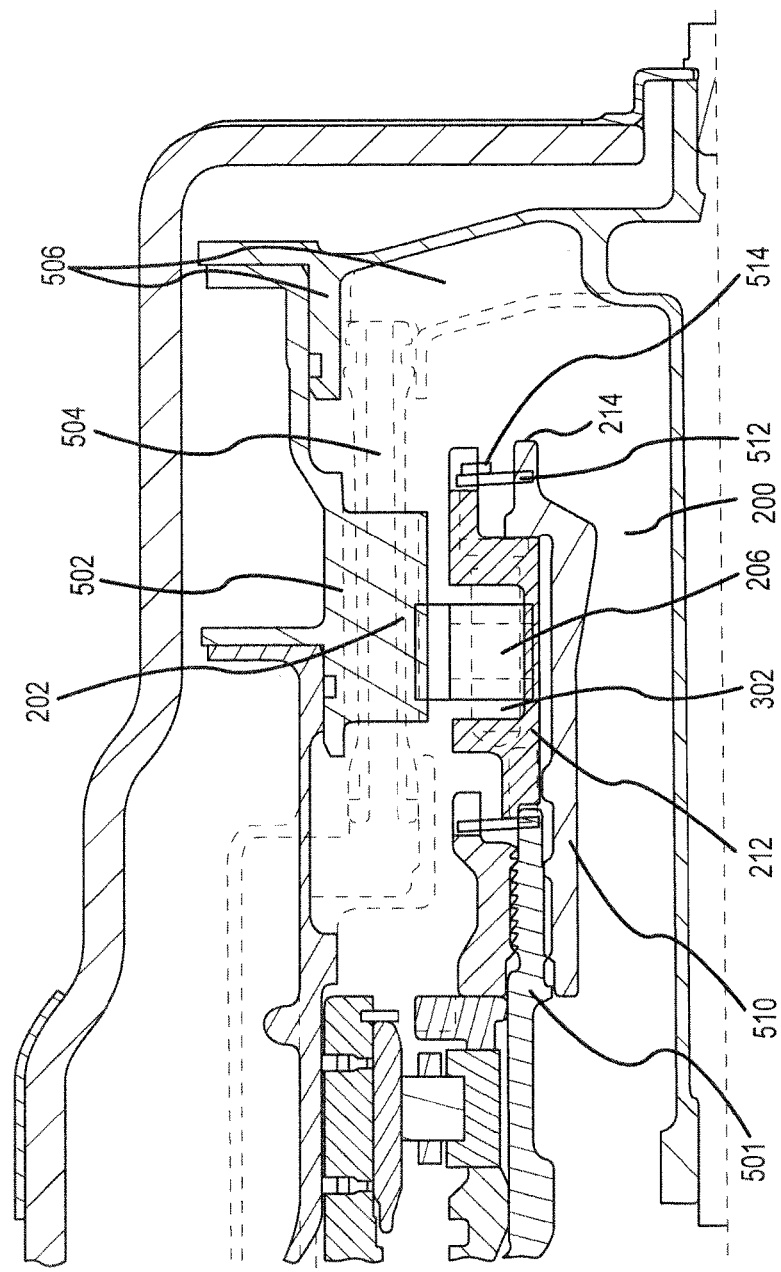
FIG. 5 illustrates an anti-rotation device according to various embodiments in a turbofan engine.

With reference to FIG. 5, a low pressure turbine is shown in cross section having anti-rotational device 200. Ratchet 202 is shown disposed coaxially to pawl carrier 212. Ratchet housing 502 constrains the ratchet 202 from rotation. Tube 504 and rear cover 506 are also shown proximate ratchet housing 502. Low pressure turbine shaft 501 is shown coupled to pawl carrier 212 via pawl nut 214. Key washer 512 and retaining ring 514 are shown proximate the pawl carrier 212.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-rotational system for preventing reverse windmilling of a turbine shaft rotationally disposed about an axis of rotation in a turbofan engine, the system comprising:
   a ratchet housing secured to and constrained from rotational movement with respect to the turbofan engine;
   a pawl carrier configured to rotate about the axis of rotation within the ratchet housing, the pawl carrier rotationally coupled to the turbine shaft via a pawl nut, the pawl nut having an outer surface including a first portion and a second portion spaced axially from the first portion, the first portion directly coupled to the turbine shaft and the second portion directly coupled to the pawl carrier; and
   a pawl pivotably mounted to the pawl carrier on a pivot joint, the pawl having a contact portion and a counterweight portion,
   wherein the pivot joint is between the contact portion and the counterweight portion,
   wherein the contact portion engages the ratchet housing and prevents the turbine shaft from rotating in a first rotational direction about the axis of rotation, and
   wherein the counterweight portion is configured to be radially inward of the contact portion in response to rotation of the pawl carrier about the axis of rotation in a second rotational direction at an angular velocity less than a predetermined angular velocity.

2. The anti-rotational system of claim 1, wherein the counterweight portion is configured to be radially outward of the contact portion in response to rotation of the pawl carrier about the axis of rotation in the second rotational direction at an angular velocity greater than a predetermined angular velocity.

3. The anti-rotational system of claim 1, wherein a center of mass of the pawl is located more proximate the counterweight portion than the contact portion.

4. The anti-rotational system of claim 1, wherein the ratchet housing comprises a ratchet tooth.

5. The anti-rotational system of claim 4, wherein the contact portion is configured to engage the ratchet tooth in response to rotation of the pawl carrier in the first rotational direction, wherein the turbine shaft is constrained from rotation.

6. The anti-rotational system of claim 1, wherein a second pawl is pivotably mounted to the pawl carrier and a third pawl is pivotably mounted to the pawl carrier.

7. The anti-rotational system of claim 6, wherein the pawl, the second pawl and the third pawl are spaced 120 degrees apart on the pawl carrier.

8. The anti-rotational system of claim 1, wherein the predetermined angular velocity is between about 500 rpm and 1500 rpm.

9. The anti-rotational system of claim 1, wherein the pivot joint is at least one of lubricated and plated.

10. The anti-rotational system of claim 1, further comprising a stop pin disposed on the pawl carrier.

11. The anti-rotational system of claim 1, wherein the pawl comprises a cutout portion.

* * * * *